United States Patent Office 3,528,937
Patented Sept. 15, 1970

3,528,937
AQUEOUS SOLUTIONS OF POLYAMIDE ACIDS
Reginald John William Reynolds, Kegworth, and John David Seddon, Bowdon, near Altrincham, England, assignors to Imperial Chemical Industries Limited, London, England, a corporation of Great Britain
Continuation-in-part of application Ser. No. 500,992, Oct. 22, 1965. This application Feb. 15, 1968, Ser. No. 705,847
Claims priority, application Great Britain, Nov. 11, 1964, 45,957/64; Apr. 5, 1965, 14,327/65
Int. Cl. C08g 51/24, 20/24
U.S. Cl. 260—29.2                          8 Claims

ABSTRACT OF THE DISCLOSURE

An aqueous solution of a salt of a polyamide acid with a salt-forming organic base of dissociation constant (pKa) of 5 or higher, present in at least the stoichiometric amount requred to neutralise all the free carboxylic acid groups in the polyamide acid, especially a polyamide acid derived from a tetracarboxylic acid dianhydride and a diprimary amine which can be cyclised to the corresponding polyimide, may be used to form films and fibres and coated and impregnated articles.

---

Figure 1:
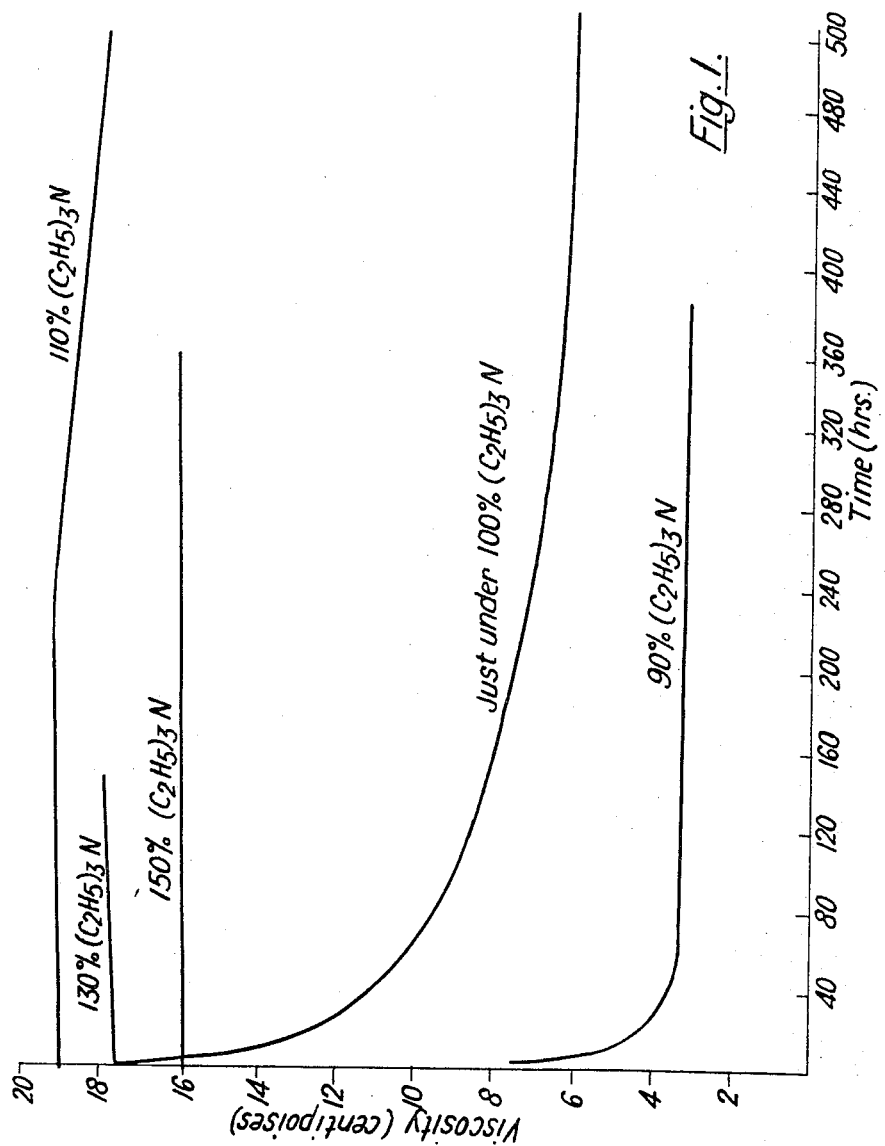

This is a continuation-in-part of prior U.S. application Ser. No. 500,992, filed Oct. 22, 1965, now abandoned.

This invention relates to aqueous solutions of polyamide acids which may be used as coating compositions.

By the term polyamide acids, in the specification and in the claims, we mean polymers formed by the polycondensation of:

(i) amines having two amino groups, each of which is primary or secondary in nature, attached to separate carbon atoms,
(ii) organic acids containing three or more carboxylic acid groups at least two of which are attatched to adjacent carbon atoms (or amide-forming derivatives of said organic acids), the conditions of the polycondensation being such that only two of the carboxylic acid groups take part in the polycondensation thereby yielding a polyamide having unreacted carboxylic acid groups pendent from the repeating units of the polmyer chains.

Polyamides acids from tetracarboxylic acids capable of forming dianhydrides and diprimary amines are of special interest because they are capable of being shaped by conventional techniques and may then be converted with loss of water to infusible polyimides having a very useful combination of chemical, thermal and electrical properties.

These polyamide acids are generally obtained as solutions in highly polar solvents, e.g. N,N-dialkylcarboxamides, and may be used as such in coating and film-forming operations. However, because of the nature of the solvents, these operations may be both hazardous due to toxicity and costly, and it would be desirable to discover a solution which is cheaper to use and less toxic.

Solutions of these polyamide acids in media containing water cannot be used because the polymers are hydrolytically unstable; for example, even solutions in dimethylacetamide which has not been thoroughly dried exhibit loss of viscosity in standing, and with water concentrations of 0.5% by weight or more the viscosity drop may be rapid. For instance, a solution of a polyamide acid (derived from 4,4'-diaminodiphenyl ether and pyromellitic acid dianhydride and having an intrinsic viscosity of 0.72) in dimethyl acetamide which had been dried over phosphorus pentoxide and contained only 0.02% by weight of water showed a reduction in viscosity from 8 centipoises to 6 centipoises (i.e. a 25% drop) in 15 days.

We have found quite unexpectedly that by converting free carboxylic acid groups of the polyamide acid to corresponding organic base salt groups, an improvement in hydrolytic stability is obtained so that aqueous solutions thereof may be used in coating and film-forming operations.

According to our invention we provide an aqueous solution of an organic base salt of a polyamide acid.

The term aqueous solution includes not only solutions of the salts in water but also in water diluted with water-miscible organic liquids, the addition of which may be desirable, e.g. for reducing viscosity.

According to a further embodiment of our invention, we provide a process for forming these aqueous solutions in which a polyamide acid is reacted with an organic base under conditions promoting ionic reaction, thereby obtaining the corresponding polyamide acid salt and, simultaneously with or following the conversion, the salt is dissolved in an aqueous medium.

In order to obtain aqueous solutions having the best resistance to hydrolytic degradation and which may be used e.g. in fibre-forming, film-forming and coating operations after storage, it is generally necessary to ensure that substantially all of the free carboxylic acid groups of the polyamide acid have been neutralised; i.e. the polyamide acid must be reacted with at least a stoichiometric amount of base.

Our invention is particularly applicable to polyamide acids derived from primary amines, because the products so obtained can be converted by cyclisation to the corresponding polyimides. The salt-forming organic base should be volatile under the conditions used for cyclisation, thereby allowing removal from the polymer: it should be vapourisable at 300° C. and a pressure of 0.1 mm. of mercury absolute.

The preferred polyamide acids can be formed from diprimary amines and tetracarboxylic acid dianhydrides having the structure:

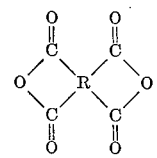

where R is a tetravalent organic radical containing at least two carbon atoms and not more than two carbonyl groups of the dianhydride are attached to any one carbon atom of the tetravalent radical. R may contain or be derived from an aromatic, aliphatic, cycloaliphatic or combination of aromatic and aliphatic groups and substitution derivatives thereof. However, the preferred dianhydrides are those wherein each anhydride group is attached to an aromatic nucleus since with the correct choice of diamine these give polymers having good thermal stability. Examples are pyromellitic dianhydride; dianhydrides derived from fused aromatic systems, as in naphthalene-2,3,6,7-tetracarboxylic acid dianhydride, naphthalene-1,2,5,6-tetracarboxylic acid dianhydride and perylene-3,4,9,10-tetracarboxylic acid dianhydride, and dianhydrides wherein the anhydride groups are attached to different benzene rings which are linked together, as in diphenyl-3,3',4,4'-tetracarboxylic acid dianhydride, diphenyl-2,2', 3,3'-tetracarboxylic acid dianhydride, 2,2-bis(3,4-dicarboxyphenyl(propane dianhydride, bis(3,3-dicarboxyphenyl) ether dianhydride, bis(3,4-dicarboxyphenyl) sulphone dianhydride, benzophenone-2,2',3,3'-tetracarboxylic acid dianhydride and benzophenone-3,3',4,4'-tetracarboxylic acid dianhydride. The much preferred dianhydrides are pyromellitic dianhydride, benzophenone-3,3',4,4'-tetracarboxylic acid dianhydride and the dianhydrides of naphthalene tetracarboxylic acids. An example of a non-aromatic dianhydride is ethylene tetracarboxylic acid dianhydride.

Examples of tricarboxylic acids from which polyamide acids may be formed are tricarballylic acid and trimellitic acid.

Examples of diprimary amines from which the preferred polyamide acids may be formed are alkylene diamines and their substitution derivatives such as ethylene diamine, hexamethylene diamine, heptamethylene diamine, octamethylene diamine, nonamethylene diamine, decamethylene diamine, 3-methyl heptamethylene diamine, 4,4-dimethyl heptamethylene diamine, 2,11-diaminododecane, 2,2-dimethylpropylene diamine, 2,5-dimethyl hexamethylene diamine, 2,5-dimethyl heptamethylene diamine, 5-methyl nonamethylene diamine, 2,17-diaminoeicosane, 1,4-diaminocyclohexane, 1,10-diamino-1,10-dimethyldecane, di(4 - aminocyclohexyl)methane, 1,12-diaminooctadecane, 3-methoxyhexamethylene diamine, diprimary amines derived from aliphatic compounds having chains comprising carbon atoms together with oxygen, nitrogen, or sulphur atoms, such as diaminopropyl tetramethylene diamine, 1,2-bis(3-aminopropoxyethane) and diprimary amines having the structure:

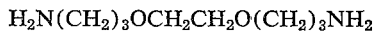

$H_2N(CH_2)_3OCH_2CH_2O(CH_2)_3NH_2$

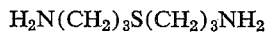

$H_2N(CH_2)_3S(CH_2)_3NH_2$ and

$H_2N(CH_2)_3N(CH_3)(CH_2)_3NH_2$ aromatic and araliphatic diamines such as m- and p-phenylene diamines, 2,2-bis(p-aminophenyl) propane, bis(p-aminophenyl) methane, benzidine, 4,4'-diaminodiphenyl sulphide, 4,4'-diaminodiphenyl sulphone, 4,4'-diaminodiphenyl ether, 1,5-diaminonaphthalene, 3,3'-dimethyl benzidine, 3,3'-dimethoxy benzidine, 2,4-bis (β-amino-t-butyl) toluene, m-xylylene diamine and p-xylylene diamine, and heterocyclic diamines. Disecondary diamines may be used where ultimate conversion to the polyimide is not intended. Examples are piperazine and bipiperidyls. In order to obtain polymers having good thermal properties, it is generally preferred to use an aromatic diamine. 4,4'-diaminodiphenyl ether and 4,4-diaminodiphenyl sulphone are very suitable and may be used in combination if desired.

The manner in which the polyamide acid may be prepared is more fully described, for example, in U.K. specification No. 898,651. The polyamide acid may be made by adding the tetracarboxylic acid dianhydride, with thorough stirring, to a solution of the diamine in a highly polar solvent which has the property of retaining the resulting polymeric product in solution; for example dimethyl formamide, dimethyl acetamide and the like. The solid polymer may then be obtained by pouring the resulting solution into another solvent, for example dioxane, in which the polymer is insoluble. Mixtures of tetracarboxylic acid dianhydrides and mixtures of diamines may be used as desired.

The polyamide acids, however formed, may be converted to our specified salts by treatment with organic bases under conditions promoting ionic reaction. The aqueous solutions of the salts are formed by effecting the salt formation in the desired aqueous medium or dissolving the pre-formed salt in the medium. Suitably, the polyamide acids may be added in finely divided form to a dilute aqueous solution of organic base, thereby yielding the aqueous solution direct. Alternatively, a solution of polyamide acid may be added to an aqueous solution of a suitable organic base, the concentrations being adjusted, if necessary, to avoid precipitating the salt.

The organic base should be present in at least the stoichiometric amount desired to react with all the free carboxylic acid groups in the polymer where solutions which may be used after many days storage are required.

In practice, it is generally desirable to use an excess of the base, e.g. up to 1.5 times the stoichiometric amount. The process chosen to effect salt formation should not be such as to expose the polyamide acid to water before salt formation has been effected as this can lead to degradation. Thus, for example, the polyamide acid is preferably added to the aqueous base solution and not vice-versa.

The organic base must be capable of salt formation and must give a salt which is soluble in aqueous media. It should have a dissociation constant (pKa) of 5 or higher to reduce the likelihood of the salt being hydrolysed, and preferably is selected from organic amines, especially non-aromatic amines, particularly those in which each organic group linked to the nitrogen atom contains not more than six carbon atoms. Tertiary amines are best for stabilising the polyamide acid against hydrolysis. Bases having boiling points below 150° C. at atmospheric pressure are particularly preferred because of the ease with which they may be removed in cases where the polyimide is eventually formed. It is advantageous to use a cheap base where it is intended ultimately to form the polyimide because of the difficulty of base recovery during the polyimide formation step. Examples of preferred bases are primary amines, e.g. n-propylamine, isopropylamine, n-butylamine, n-amylamine, iso-amylamine, cyclohexylamine, allylamine and ethanolamine; secondary amines, e.g. methylethylamine, diethylamine, diisopropylamine, di-n-butylamine and diisobutylamine and especially tertiary amines, e.g. trimethylamine, triethylamine, diethylmethylamine and triisobutylamine and mixtures of these with each other. Trimethylamine and triethylamine are particularly preferred.

Trimethylamine in particular is better than methylamine or dimethylamine in stabilising the dissolved polyamide acid against hydrolytic breakdown, and it is better than other tertiary amines such as triethylamine in that it enables polyimide to be made more quickly and in more massive form; e.g. thicker films can be produced with shorter processing times.

The aqueous solutions of the salts of polyamide acids of tetracarboxylic acid dianhydrides are in general very viscous and may be difficult to use in film-forming and coating operations, except in dilute form. A reduction in viscosity may be obtained in the case of more concentrated solutions, by replacing some of the water with a water-miscible organic liquid which does not precipitate the polymer. By this means, more concentrated solutions may be obtained which are still sufficiently fluid to be used in film-forming and coating operations. Sometimes, a slight cloudiness may occur but this is acceptable so long as precipitation is avoided. For example, we have found that while the maximum concentration in aqueous solution of the polyamide acid from pyromellitic dianhydride and 4,4'-diaminodiphenyl ether concomitant with satisfactory flow characteristics is 30 g./litre, the addition of an equal volume of isopropanol more than doubles it. In general it is preferred to obtain as concentrated a solution as possible so as to reduce evaporation problems to a minimum and avoid undue costs. The preferred solutions for coating and film-forming operations contain at least 50 g. of polymer per litre of solvent, the maximum being controlled principally by the need to retain adequate flow characteristics.

Examples of suitable organic liquids are ethers, e.g. dioxan; alcohols, e.g. ethanol and isopropanol; nitriles, e.g. acetonitrile and N,N-dialkyl-carboxamides, e.g. dimethylacetamide and dimethylformamide. The amount of organic liquid added should be insufficient to cause precipitation and essentially a single phase should be maintained. The addition of large amounts may offset the economic advantages of using aqueous solutions. Suitable amounts of any particular organic liquid may be determined by simple experiment but generally will not exceed the amount of water present, by volume. The preferred liquids are water-miscible alcohols. Mixtures of organic liquids may also be used.

Our aqueous solutions provide a very convenient basis for the production of filaments and unsupported film or for the coating of substrates by a route which provides an alternative to the procedures of application and formation from solution in organic solvents (which are frequently expensive, toxic and liable to create fire hazards). They may be applied readily to substrate and according to a further embodiment of our invention we provide a process which comprises applying to the substrates our specified aqueous solutions and drying the composite products so formed.

The solutions may be applied by conventional techniques such as, for example, dipping, spraying, brushing and air- and doctor-knife coating. Suitable substrates include plastics, metals (e.g. copper, brass, aluminium or steel), wood, rubber, glazed and unglazed ceramics, glass and mineral materials. The substrates may be in any form, e.g. sheets, fibres, wires, foams or fabrics. They may be absorbent (as in the case of glass fibre or asbestos fibre mats, for example) and impregnated products may be formed which may be built up to form laminates, if desired. The coating process may be used to provide an adherent polyamide acid coating to the substrate in which case some pre-treatment of the substrate may be desired in order to ensure adequate adhesion. Such pre-treatment processes are well known and include, for example, the etching of metals and roughening of plastic films, e.g. by corona discharge.

As an alternative, our aqueous solutions may be applied to a smooth surface (e.g. polished steel, polythene, polypropylene, polyethylene terephthalate, polytetrafluoroethylene or glass) and thereafter stripped from it to give an unsupported film. Coatings or films up to 0.005 inch or thicker may be obtained by a single application of the solution.

If desired, the coating may contain various additives, for example colouring matters and fillers, which may conveniently be added to the aqueous solution used in the coating step. Such additives should be selected on the basis of their physical properties, e.g. so that they do not adversely affect the desired properties of the final polyamide acid salt (or polyimide) and, where desired, so that they do not themselves decompose or discolour during the heating step which may be required to convert the polyamide acid salt film to polyimide.

Filaments may be spun from our aqueous solutions, for example by dry spinning or spinning into a non-solvent for the polymer, e.g. dioxan.

Dry spinning is preferable for making filaments from solutions of the salts of polyamide acids with organic bases. For example, a polyamide acid organic salt solution of viscosity in the range of from 1500 to 2000 poises at 30° C. is spun into an atmosphere at a temperature such that the filaments acquire a sufficient degree of coherence to permit their convenient wind-up or other mechanical handling and later processing. The emergent filaments, for example, may be passed in co-current with a stream of heated gas, such as nitrogen, downwardly through a heated chimney; the temperature of the gas may be in the range 150 to 250° C. Some conversion of polyamide acid to polyimide can occur under such conditions but this is acceptable and does not ordinarily occur to a degree such that the gathered filaments cannot be partially oriented by drawing before full conversion of their polyamide acid to polyimide. Filaments of great utility may be obtained by partial orientation before conversion to polyimide, followed by further drawing to the desired total degree of orientation.

Where the aqueous solutions are derived from polyamide acids of diprimary amines and tetracarboxylic acid anhydrides, the resulting shaped articles, e.g. coatings, films, fibres, etc., may be converted to insoluble polyimide without the molecular degradation and deterioration hitherto found to occur with the polyamide acid precursors from tetracarboxylic acid dianhydrides in the presence of water. The conversion may be effected simply by heat alone or e.g. in the presence of compounds known per se as acceptors for the base that is formed as a by-product; e.g. acetic anhydride. It may be desirable to effect the reaction in vacuo in order to aid the removal of the base. In general, the time required for the heating operation is less at higher temperatures than at lower temperatures, and suitable times are of the order of from 6 hours at 150° C. to 15 minutes at 360° C. Faster heating conditions generally require very close control. If the heating is such as to allow free base to be trapped, degradation may be caused. On the other hand, it is preferred to avoid the production of free base substantially before cyclisation is effected. Partial conversion to polyimide may be effected if desired by the use of less extreme conditions.

As stated above, the conversion to polyimide involves loss of organic base and in the case of thick films and coatings, the released compound may find difficulty in escaping. For this reason, where it is intended to convert the film or coating to polyimide it may be necessary to restrict its thickness to 0.003 inch or less, thicker products being built up by repeated coating and cyclisation. The use of trimethylamine enables thicker films to be prepared directly.

After the baking stage, the polymers usually adhere strongly to the substrate surfaces, so that if it is desired to make unsupported polyimide film, the polyamide acid salt film should be stripped from the substrate before conversion to the insoluble polyimide has proceeded so far that the operation becomes difficult.

Where it is not desired to convert to polyimide, overheating should be avoided while removing the solvent.

Uniaxial and biaxial orientation of polyamide acid (or salt) films may be accomplished by conventional rolling or stretching methods analogous to the so-called cold-drawing of fibres. It is convenient to arrive at a uniaxially or biaxially oriented polyimide film by conversion of a uniaxially or biaxially oriented film of polyamide acid (or organic base salt thereof), but with care conversion may be effected to some degree simultaneously with orientation, and orientation after polyimide formation may also be possible with the assistance of an organic liquid possessing good solvation and penetration properties which can cause swelling of the polyimide polymer and achieve sufficient ductility for adequate orientation.

A process of selective etching, e.g. for making printed circuits, may be operated by a modification of our invention wherein a suitable substrate is provided with a coating of a polyamide acid salt selected parts of which are then converted to polyimide. The unconverted material may then be removed, for example, by washing in a suitable selective solvent, e.g. water.

The polyimides formed by cyclisation of the polyamide acid salts derived from aromatic tetracarboxylic acid dianhydrides and aromatic diamines are generally insoluble, chemically resistant and heat-resistant materials possessing excellent insulation properties. They may, if desired, contain additives that were incorporated for example in the polyamide acid salt solutions.

Our invention provides a ready and cheap method of obtaining a shaped polyimide article via the corresponding polyamide acid salt. It is particularly suitable, for example, for obtaining polyimide coatings, e.g. polyimide-insulated electrical conductors. Polyimide films may also be formed by our process and may be used wherever plastic films have been used hitherto. They serve advantageously in a wide variety of wrapping and packaging applications, where their resistance to degradation by high energy particles and γ-ray radiation may be particularly useful. Films may also be used as high temperature electrical insulation, e.g. as slot liners or cable wrappings. Films having very thin metal coatings deposited thereon, e.g. by high vacuum techniques, may find use as heat reflectors, particularly in areas exposed to radiation.

Polyimide filaments may find use as electrical insulation and in the production of protective clothing.

The uniaxially oriented films of polyamide acid (or salt) and the polyimide may be fibrillated to form fibrous materials. The film should be as highly oriented as possible in one direction and in order to achieve this it may be necessary to effect the drawing in a stepwise manner, e.g. in 2 or 3 stages with controlled heat-treatment of the film between consecutive stages. Thereafter the film may be induced to fibrillate by various mechanical treatments which may for example involve rolling the oriented film sandwiched between gripping rubber sheets or passing the film in tension between meshing rotating beds of needle-like knives which operate at effective peripheral speeds slower than the speed of film travel and so cause slitting of the film at a multitude of localised sites. Alternatively, explosive particles may be finely dispersed in the film during its preparation, and their explosion after the film has been oriented results in local rupture leading to a fibrillated film having a high proportion of very low denier fibrils.

The fibrous materials formed from the fibrillated films can be used for insulation purposes (both thermal and electrical) and in protective fabrics (when woven as flat or twisted tapes) as well as in other more familiar outlets for fibrous materials.

The invention is illustrated but not limited by the following examples in which the parts and percentages are by weight. In all the examples and elsewhere in the specification, the recorded intrinsic viscosities were measured on solutions in dimethyl acetamide at 25° C.

EXAMPLE 1

Pyromellitic dianhydride was added slowly to a solution of 17.7 g. (0.088 mole) of 4,4'-diaminodiphenyl ether in 332 g. of anhydrous dimethyl acetamide until the viscosity of the solution reached a maximum value (6,300 centipoises). At this point 19.2 g. (0.088 mole) of pyromellitic dianhydride had been added. This solution was diluted with 350 g. of anhydrous tetrahydrofuran and the diluted solution was divided into five approximately equal portions, each of which was poured into 450 ml. of anhydrous diethyl ether in a high speed mixer to precipitate the polymer. The precipitated polymer was further washed with ether in the mixer and then dried at 30° C. under vacuum. The isolated polymer, obtained in quantitative yield, had an intrinsic viscosity of 2.27.

A portion of the polyamide acid (4.18 g.) was dissolved by pouring with agitation into dilute aqueous triethylamine (83.6 ml. of a 0.26 N solution), containing triethylamine equivalent to 110% of the free carboxyl groups in the polyamic acid. This solution was diluted, by the addition of a further 59.3 ml. of water, to a solids content of 2.8%. The viscosity of this solution was 14.5 centipoises at 25° C. when freshly made and 14.0 centipoises at 25° C. (i.e. over 96% of its initial value) after storing for 150 hours. By way of comparison, a 5% solution of the polyamide acid itself in dimethylacetamide containing 0.02% by weight of water had an initial viscosity of 47.8 centipoises at 25° C. (i.e. only 92% of its initial value) after storing for 95 hours at 20° C.

Films of the aqueous salt solution were cast onto sheets of glass, mild steel, aluminium and tin plate and dried in vacuo at 30° C.

By way of example of how to convert these films to polyimide, they were removed from the sheets and further dried by heating at 100° C. in vacuo and finally converted substantially completely to the polyimide by heating in vacuo for 6 hours at 150° C.

Films which were not removed from the sheets after the preliminary drying, but were heated to 150° C. while still attached to the plates, were found to adhere very strongly to the substrate, giving a hard, pale yellow protective coating which was resistant to most chemicals and to heating at 300° C.

EXAMPLE 2

The polyamide acid prepared as in Example 1 was dissolved in a solution of (1) trimethylamine or (2) triethylamine in 50% v./v. aqueous isopropanol to give solutions containing 10 g. of polyamide acid in 100 ml. of solution and containing trimethylamine or triethylamine in 10% molar excess over the amount required to neutralise all the free carboxyl groups.

Each of these solutions was cast onto a glass plate at room temperature. The solvent was allowed to evaporate for 24 hours. The films were stripped off and heated in a brisk flow of dry nitrogen. The temperature was raised from 20° C. to 300° C. in the first 50 minutes and then to 325° C. in the next ten minutes. They were then rapidly cooled, still under dry nitrogen, to room temperature. Each film was 0.001 inch thick. The film (1) from the trimethylamine solution was yellow and quite transparent. The film (2) from the triethylamine solution was also yellow but opaque. The opacity was due to the presence of bubbles in the film which were detrimental to its mechanical properties.

The above procedure was followed to prepare films 0.002 inch thick. Film (1) was yellow and clear but (2) was brown and opaque. Films 0.010 inch thick or thicker were readily prepared from the trimethylamine solution (1) but with the triethylamine solution (2) the upper limit in practice is probably not much more than about 0.008 inch even with careful heat treatment.

EXAMPLE 3

The polyamide acid (1.045 g.) prepared as in Example 1 was dissolved in dilute aqueous ethanolamine solution (37.4 ml. of a 0.151 N solution), containing 0.318 g. of ethanolamine (equivalent to 110% of the free carboxyl groups in the polymer).

Films were cast from this aqueous solution onto sheets of glass, mild steel, aluminium and tin plate and dried in vacuo at 30° C.

To convert these films to polyimide, they were then removed from the substrate and were heated in vacuo for 12 hours at 100° C., 6 hours at 150° C. and finally 3 hours at 200° C. or heated while still attached to the substrate to give films which adhered strongly to the support and had properties similar to the films of Example 1.

EXAMPLE 4

A polyamide acid having an intrinsic viscosity of 0.72 was prepared from pyromellitic acid dianhydride and 4,4'-diaminodiphenyl ether. The precipitated and dried polymer was divided into five portions and each portion was dissolved by pouring with agitation into aqueous solutions of triethylamine containing triethylamine equivalent to 90%, just less than 100%, 110%, 130% and 150% respectively of the free carboxyl groups in the polyamic acid. Each of the five solutions was adjusted to give 2.8 g. of polyamide acid per 100 ml. of solvent.

The change of viscosity of each solution with time was then plotted as a graph and the curves are shown in FIG. 1 of the attached drawings.

It may be seen that in both cases where less than all the free carboxylic acid groups of the polyamide acid had been converted to salt, the loss in viscosity was very sharp over the first fifty hours. On the other hand, all three solutions containing a stoichiometric excess of trimethylamine showed essentially no loss of viscosity for upwards of 10 days or even longer. Even the solution containing triethylamine equivalent to 110% of the free carboxylic acid groups showed only a 5% drop in viscosity after three weeks.

By way of comparison, a solution of the unconverted polyamide acid in dimethyl acetamide which had been carefully dried over phosphorus pentoxide and contained only 0.02% by weight of water showed a 25% drop in viscosity over a period of only 15 days.

EXAMPLE 5

A polyamide acid having an intrinsic viscosity of 2.5 was prepared from pyromellitic acid dianhydride and 4,4'-diaminodiphenyl ether. The precipitated and dried polymer was divided into four portions which were dissolved in aqueous solutions of triethylamine, diethylamine, n-allylamine and n-butylamine respectively. Each aqueous solution contained base equivalent to 130% of the theoretical amount required to neutralise all the free carboxylic acid groups of the polyamide acid and was adjusted to give a concentration of 2.8 g. of polyamide acid per 100 ml. of solvent.

Figure 2:
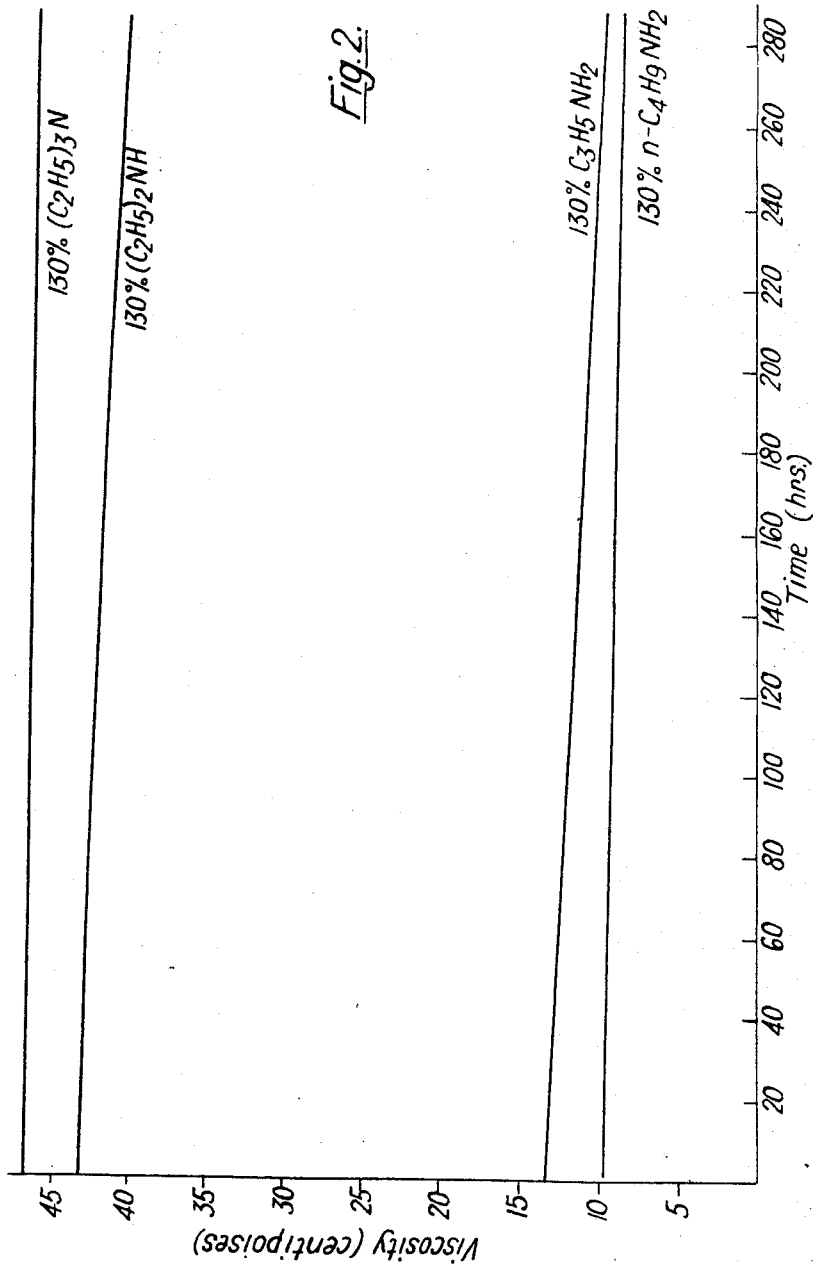

The change of viscosity of each solution with time was then plotted as a graph and the curves are shown in FIG. 2 of the attached drawings.

EXAMPLE 6

Further portions of the polyamide acid of Example 5 were dissolved in solutions in equal volumes of isopropanol and water of cyclohexylamine, di-n-butylamine and triethylamine respectively to give concentrations of 2.8 g. of polyamide acid in 100 ml. of solvent in each case. The amount of base used in all three experiments was 130% of the theoretical amount required to neutralise all the free carboxylic acid groups of the polyamide acid.

Figure 3:
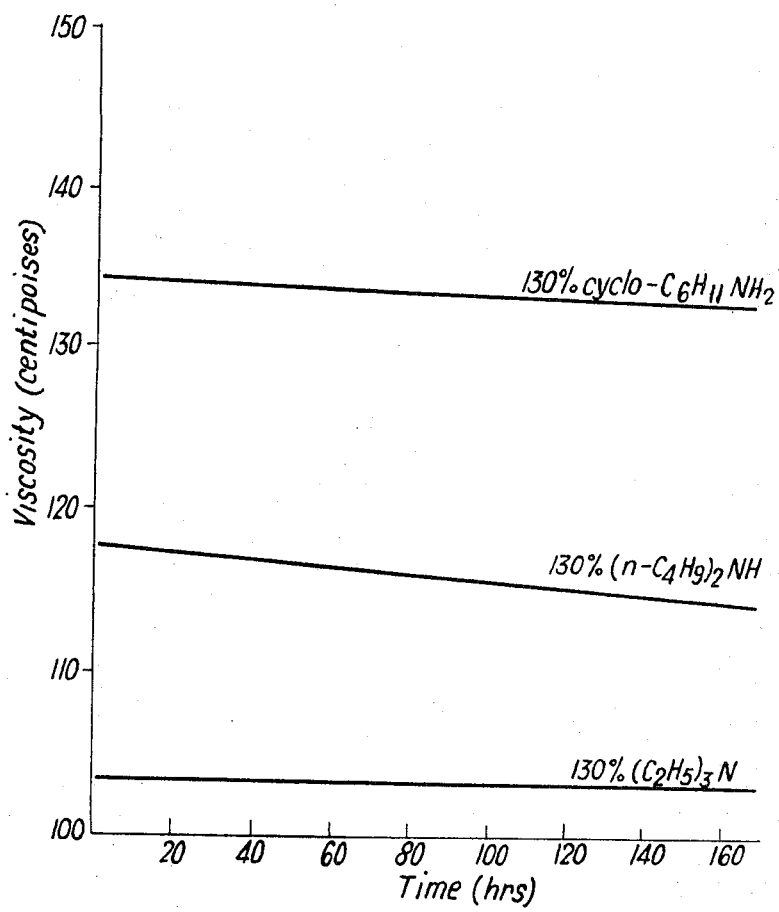

The change of viscosity of each solution with time was then plotted as a graph and the curves are shown in FIG. 3 of the attached drawings.

By comparing the appropriate curves in FIGS. 2 and 3, it may be seen that at the low concentrations involved, solutions of the triethylamine salt in water alone have lower viscosities than solutions of the same salt in a water/isopropanol mixture. The advantages replacing some of the water by a water-miscible organic liquid such as isopropanol as described hereinbefore become apparent however at higher concentrations, e.g. as demonstrated in Example 7.

EXAMPLE 7

A polyamide acid having an intrinsic viscosity of 1.75 was prepared from pyromellitic acid dianhydride and 4,4'-diaminodiphenyl ether. This was divided into a number of portions each of which was dissolved in an aqueous solution of triethylamine (equivalent to 130% the theoretical amount required to neutralise all the free carboxylic acid groups in the polyamide acid). The solutions contained isopropanol in varying amounts and the concentrations of polymer, amount of isopropanol present and viscosity of each solution is recorded in the table below.

| Conc. of solution (g. of polymer per 100 ml. of solvent) | Isopropanol conc. (percent of solution volume) | Viscosity of solution (centipoises) |
|---|---|---|
| 4.0 | 0 | 2,570.0 |
| 4.0 | 10 | 314.0 |
| 4.0 | 50 | (1) |
| 6.0 | 10 | 7,900.0 |
| 6.0 | 25 | 2,340.0 |
| 6.0 | 40 | 505.0 |

1 Too fluid to read.

EXAMPLE 8

A polyamide acid having an intrinsic viscosity of 2.5 was prepared from pyromellitic acid dianhydride and 4,4-diaminodiphenyl ether. This was divided into two portions each of which was dissolved in a solution of triethylamine (equivalent to 130% of the theoretical amount required to neutralise all the free carboxylic acid groups in the polyamide acid) to give a concentration of 10 g. of polyamide acid per 100 ml. of solvent.

In the first case, the solvent consisted of a mixture of equal volumes of isopropanol and water and the viscosity of the resultant solution was 627 poises. The second solvent consisted of 50 volumes of water, 40 volumes of isopropanol and 10 volumes of tetrahydrofuran and the viscosity of the resultant solution was 194 poises.

We claim:
1. An aqueous solution of a salt of a polyamide acid from a diamine and a tetracarboxylic acid with trimethylamine, present in at least the stoichiometric amount required to neutralize all the free carboxylic acid groups in the polyamide acid.
2. An aqueous solution according to claim 1 in which the solvent comprises a mixture of water and an amount of water-miscible organic liquid or water-miscible mixture of organic liquids which does not cause precipitation of the polyamic acid salt.
3. An aqueous solution according to claim 2 wherein the organic liquid or one of the organic liquids is an alcohol.
4. An aqueous solution according to claim 1 in which the polyamide acid is derived from a primary amine and can be converted by cyclisation to the corresponding polyimide, and the organic base is vapourisable at 300° C. and a pressure of 0.1 mm. of mercury absolute.
5. An aqueous solution according to claim 4 in which the organic base has a boiling point below 150° C. at atmospheric pressure.
6. An aqueous solution according to claim 4 in which the polyamide acid is one that can be formed from at least one diprimary amine and at least one tetracarboxylic acid dianhydride.
7. An aqueous solution according to claim 6 in which each anhydride group in the tetracarboxylic acid dianhydride is attached to an aromatic nucleus.
8. An aqueous solution according to claim 6 in which the diprimary amine is an aromatic diamine.

References Cited
UNITED STATES PATENTS

| | | | |
|---|---|---|---|
| 3,067,158 | 12/1962 | Bolton | 260—29.2 |
| 3,179,631 | 4/1965 | Endrey | 260—29.2 |
| 3,190,856 | 6/1965 | Lavin et al. | 260—65 |
| 3,242,136 | 3/1966 | Endrey | 260—47 |
| 3,247,139 | 4/1966 | Christenson et al. | 260—29.4 |
| 3,305,501 | 2/1967 | Spalding | 260—29.2 |
| 3,321,429 | 5/1967 | Thormer et al. | 260—29.4 |

JOHN C. BLEUTGE, Primary Examiner

U.S. Cl. X.R.

117—47, 93.1, 126, 128, 128.4, 132, 138.8, 148, 161; 260—32.4, 32.6, 33.2, 33.4, 47, 65, 78; 264—84, 154, 178, 205